United States Patent

[11] 3,552,731

| [72] | Inventor | Lawrence R. Selkirk |
| | | Tulsa, Okla. |
| [21] | Appl. No. | 749,080 |
| [22] | Filed | July 31, 1968 |
| [45] | Patented | Jan. 5, 1971 |
| [73] | Assignee | Sinclair Research, Inc. |
| | | New York, N.Y. |
| | | a corporation of Delaware |

[54] APPARATUS
10 Claims, 13 Drawing Figs.

[52] U.S. Cl. .................................................. 266/23,
33/21; 148/9.6
[51] Int. Cl. ....................................................... B23k 5/00
[50] Field of Search .......................................... 266/23-O,
23-N; 33/21C, 21A, 27K; 148/9.6

[56] References Cited
UNITED STATES PATENTS
974,694 11/1910 Myer............................ 75/22
FOREIGN PATENTS
1,083,625 6/1960 Germany...................... 266/23-LO Primary Examiner—Gerald A. Dost
Attorney—McLean, Morton and Boustead ABSTRACT: Apparatus for automatically cutting pipe or tubing according to a desired pattern by securing the pattern to the tubing and by rotatably mounting around the tubing a constant linear speed, positive contact drive which traces the pattern and which is connected by a transfer arm to a cutting tool.

PATENTED JAN 5 1971

INVENTOR
LAWRENCE R. SELKIRK

BY
McLean, Morton & Boustead
ATTORNEYS

INVENTOR
LAWRENCE R. SELKIRK

BY McLean, Morton & Boustead
ATTORNEYS

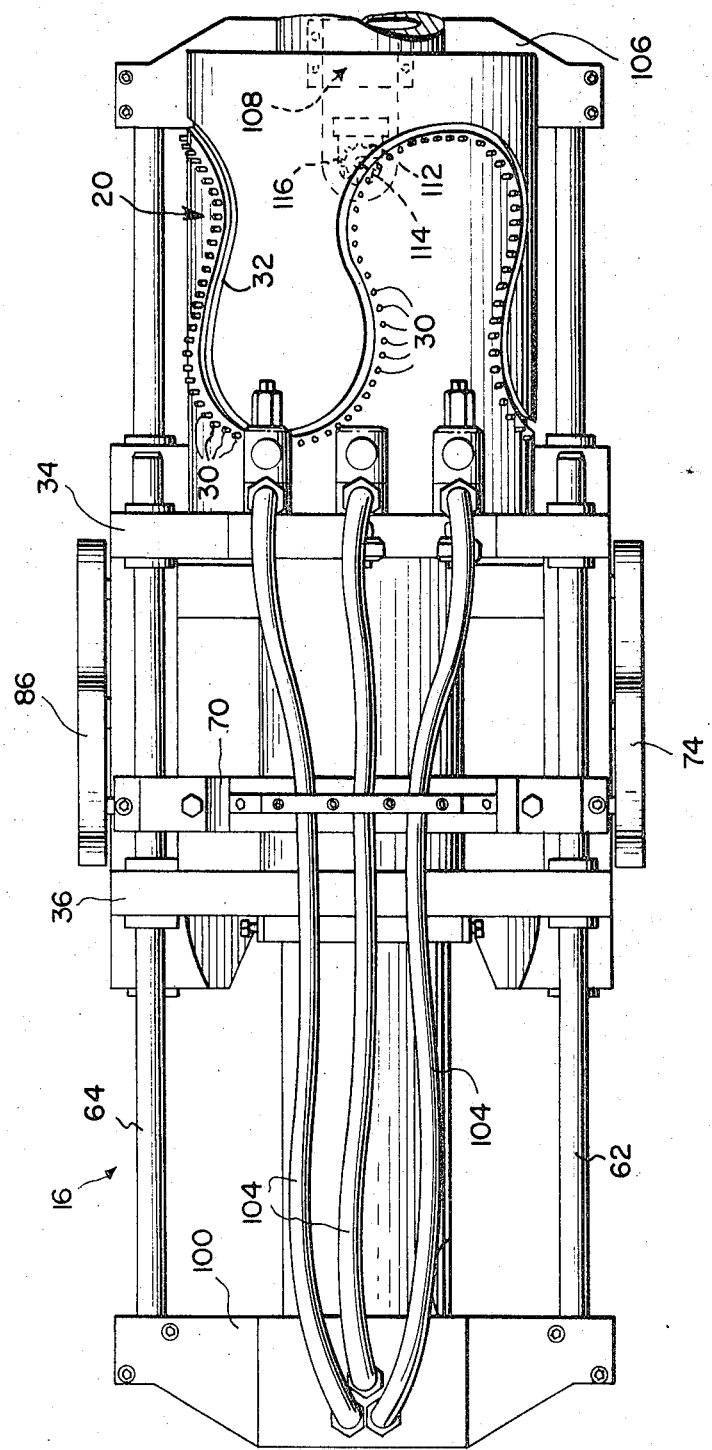

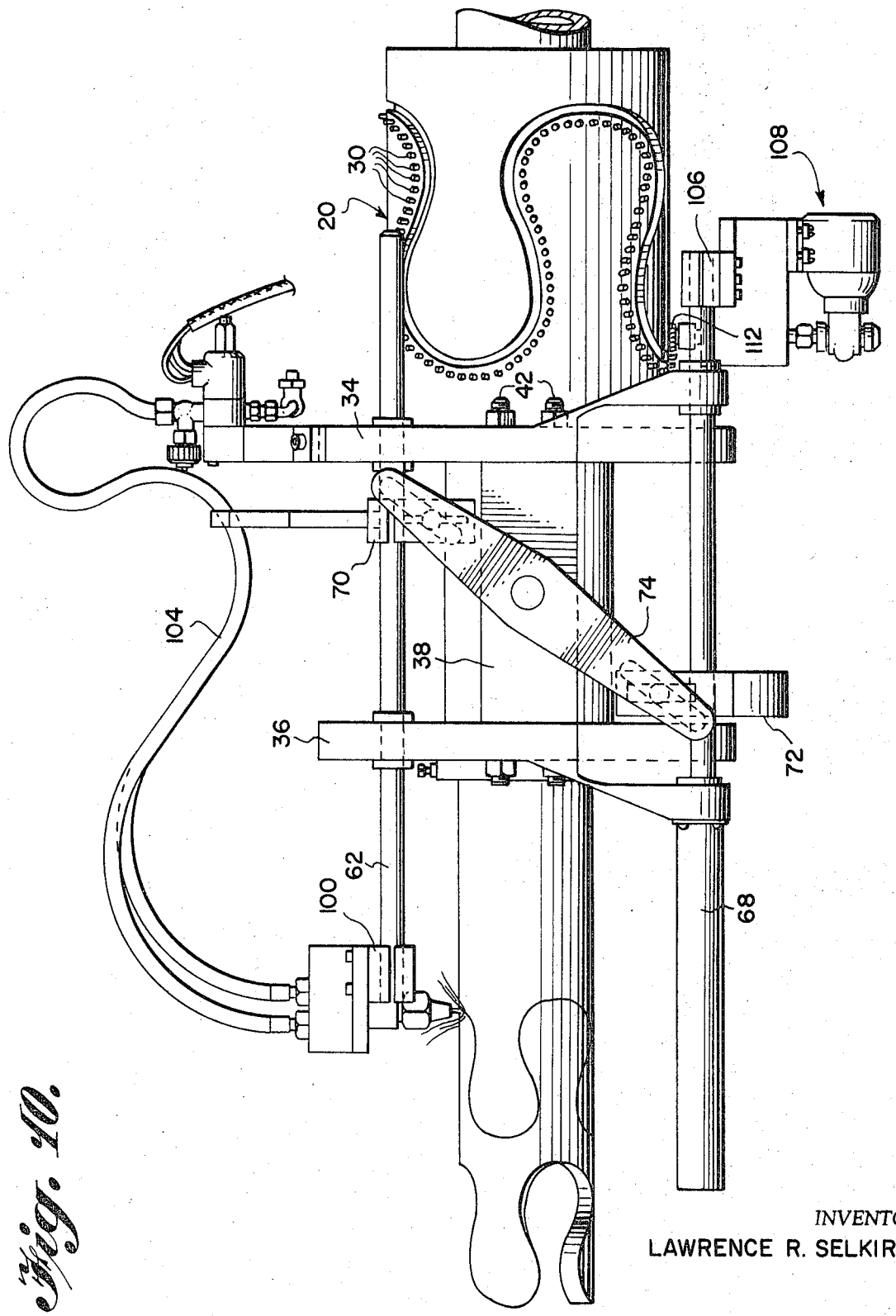

INVENTOR
LAWRENCE R. SELKIRK

BY McLean, Morton & Boustead
ATTORNEYS

APPARATUS

Numerous requirements exist for pipe or tubing cut in a complex pattern. For example, in the oil and gas exploration industry, it is often necessary to change the direction of drilling after a considerable drilling depth has been reached. This is frequently due to different substances and formations encountered underneath the earth's surface while drilling. An effective method of changing the direction of drilling is to use a drilling shaft which is flexible and for which the direction and degree of flex can be easily controlled. A flexible drilling shaft tubing can be made by cutting through a rigid pipe or tubing in a series of patterns that are designed to interlock and to retain a great portion of the strength of the rigid tubing. To retain the maximum strength and to control the degree of flex, the pattern angle and smoothness of the cut must be closely controlled.

The present invention is an apparatus for automatically cutting pipe or tubing in a complex pattern at a controlled angle of cut and with a high degree of smoothness. The apparatus has as its basic components a tubular sleeve designed to encircle the pipe or tubing to be cut and a body rotatably mounted around the pipe or tubing. The sleeve is equipped with means for clamping it to the encircled pipe or tubing and has on its outer surface a pattern which determines the cut to be made in the pipe or tubing. This pattern can be, by way of examples, a magnetic tape laid out in the pattern or a guide groove and a rack for positive contact drive. The body then includes a constant speed drive which follows the pattern, either by following the path of the magnetic tape or by tracing the groove with a positive contact drive. The drive is connected by levers or transfer arms to a cutting tool adjacent the pipe or tubing.

The cutting is accomplished by placing the tubing within the apparatus with the constant speed drive engaging the pattern, activating the cutting tool, and supplying constant speed power to the drive compatible with the tubing thickness and size so that the drive follows the pattern, causing the cutting tool to follow a corresponding pattern on the tubing at a constant linear speed sufficient to accomplish cutting of the tubing in the desired manner. When an acetylene torch is used as the cutting tool, optimum operation requires that the flame be directed downward. In such a case the tubing is rotated in the apparatus as required to cause cutting with the torch on top at all times. Alternatively, the torch is free to move completely around the tubing, if desired.

This apparatus is particularly useful when either the angular rotation or the axial motion components, or both, of the cut reverse direction as the pattern is traced. The apparatus can accommodate a wide range of tubing size and thickness. One pattern can be used with various size and thickness tubing simply by adjusting the effective length of the transfer arms to the proper ratio. This ratio if the same as the pattern-to-tubing cutting "surface" diameter ratio.

These and other aspects and advantages of the present invention are apparent in the following detailed description and claims, particularly when considered in conjunction with the accompanying drawings in which like parts bear like reference numerals. In the drawings:

FIG. 6 is an overhead plan view of the cutting apparatus shown in FIG. 1;

FIG. 10 is a side elevational view of the apparatus with the cutting torch contracted to its extreme right or closed position.

Figure 1:
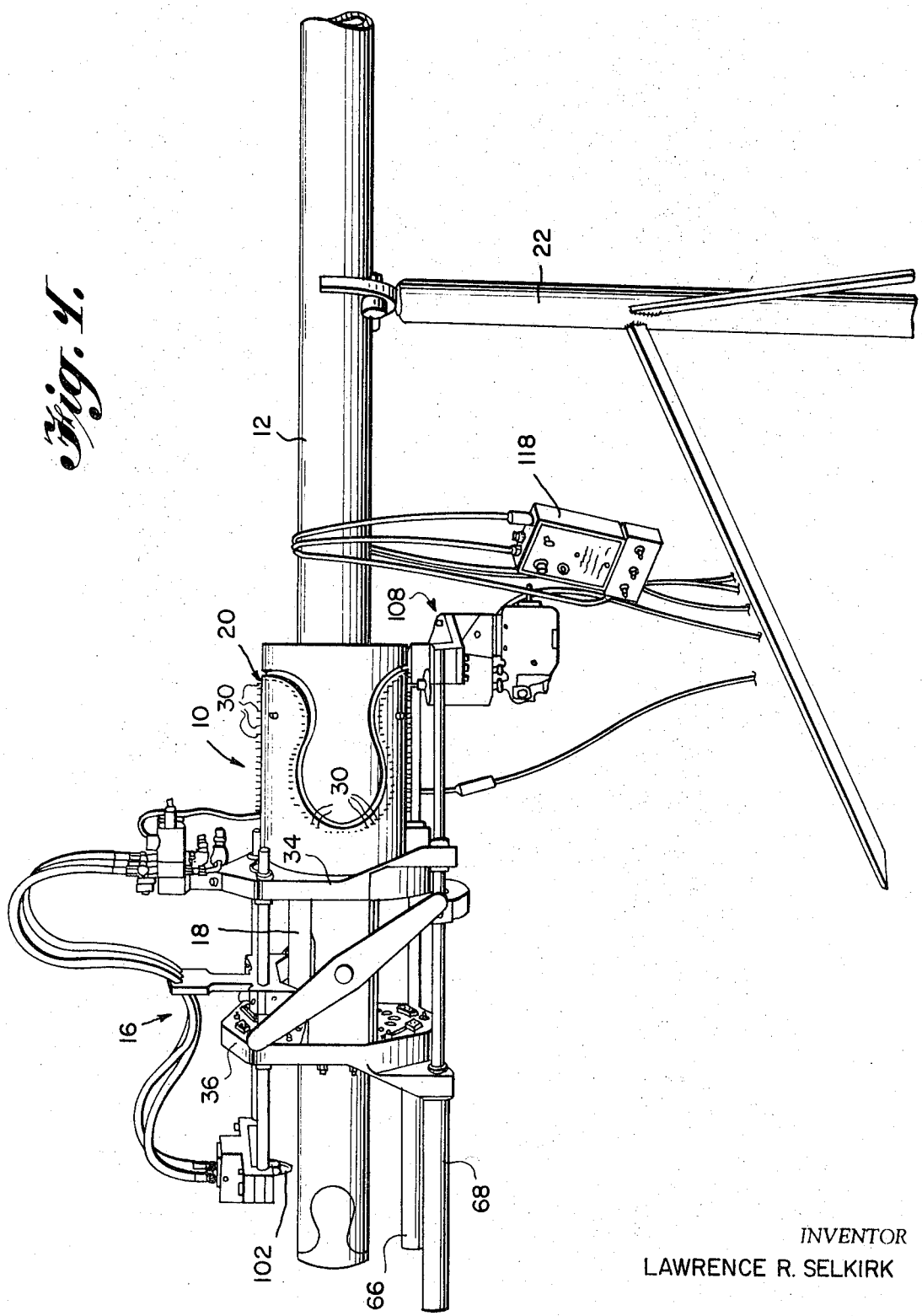
FIG. 1 is a perspective view of a preferred embodiment of the apparatus with a length of tube installed therein.
Figure 2:
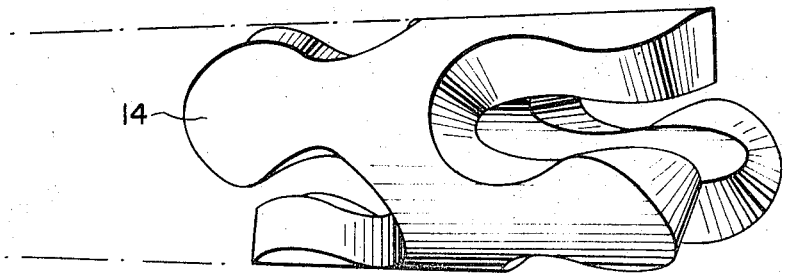
FIG. 2 is a perspective view of a finished tube section.

Tube cutter 10, shown in FIG. 1, is capable of cutting a tube 12 in a complex pattern, for example into interlocking sections such as section 14 in FIG. 2. Tube cutter 10 includes a body 16 having a tubular member 18 (FIGS. 1 and 3) with an inside diameter slightly greater than the outside diameter of the largest tube to be cut by tube cutter 10. Sleeve 20 is fastened to tubular member 18 and has on its outer surface a pattern of the cut to be made in tube 12. Tube 12 is rotatably supported by suitable means such as stand 22.

Near its first end tube 18 is encircled by annular plate 24 (FIGS. 3 and 4) which is connected to tube 18 by suitable means such as welding. Likewise, around its second end tube 18 is encircled by annular plate 26 (FIGS. 4 and 5) which also is connected to tube 18 by means such as welding. Plate 24 is provided with openings 28 to accommodate bolts 29 which fasten sleeve 20 to plate 24. Sleeve 20 encircles pipe 12 and, for example, might be a tube of steel or hardened plastic with an inside diameter greater than the outside diameter of tube 12. Around the outside surface of sleeve 20 are mounted a series of rigid pins 30 (FIG. 6) adjacent a groove 32 which is cut or ground into the outer surface of sleeve 20. The path traced by the center line of groove 32 is the pattern into which tube 12 is to be cut.

Figure 7:
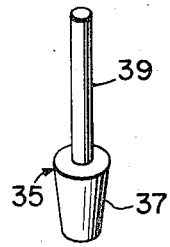
FIG. 7 is a perspective view of a bearing adapted for use in the apparatus of the present invention.
Figure 3:
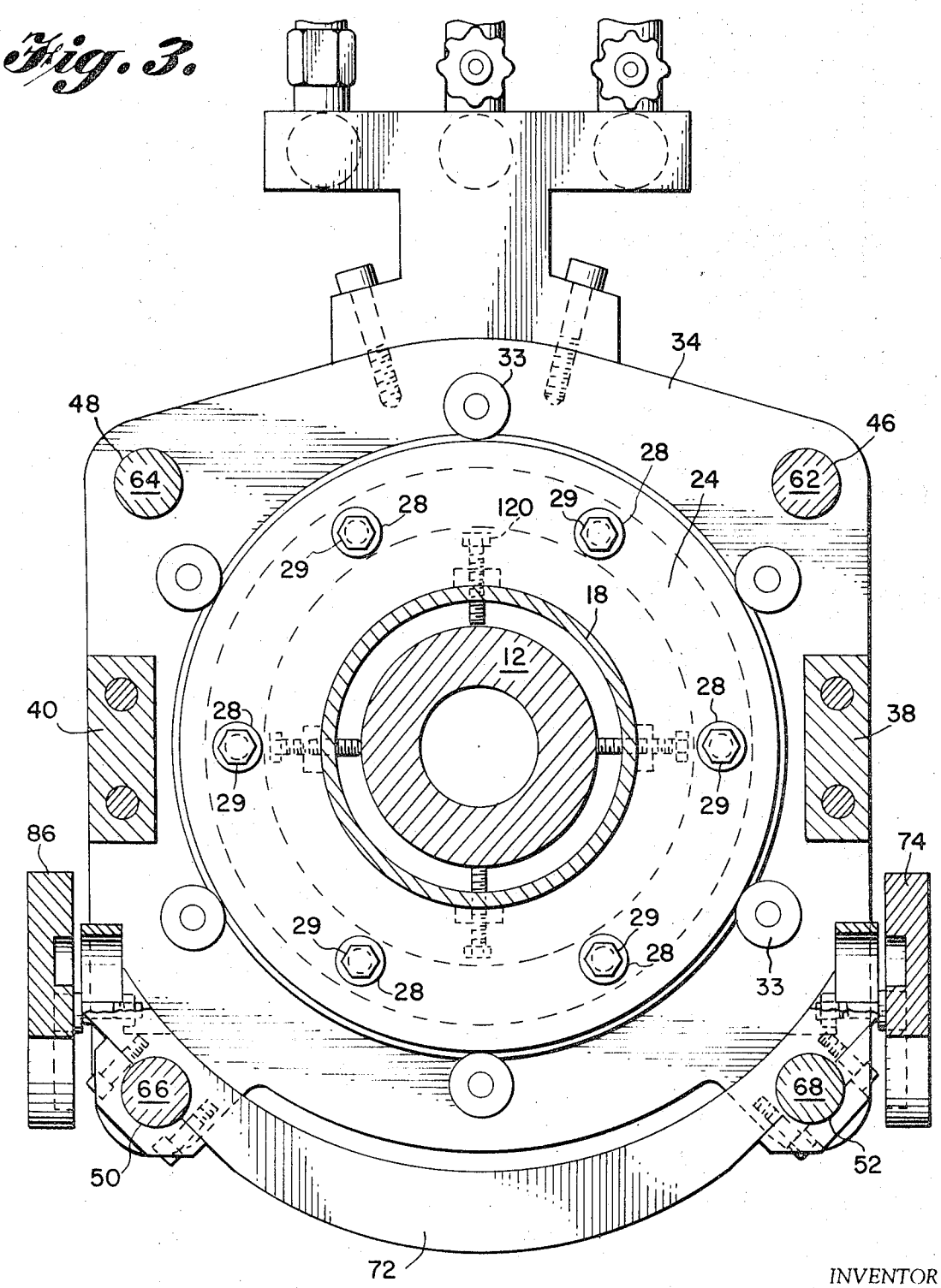
FIG. 3 is a transverse cross-sectional view taken along line 3—3 of FIG. 8.
Figure 4:
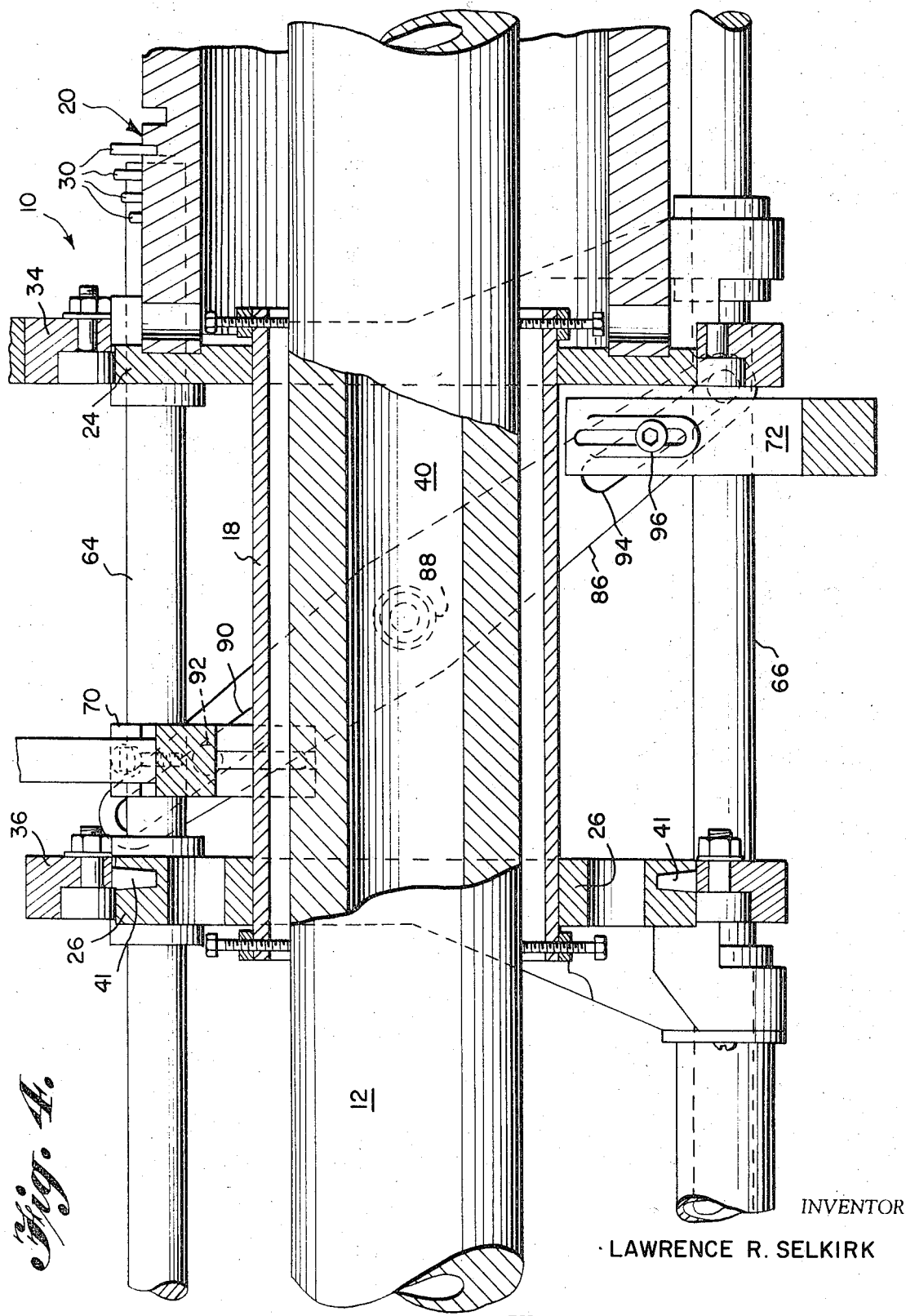
FIG. 4 is a longitudinal sectional view taken along line 4—4 of FIG. 5.
Figure 5:
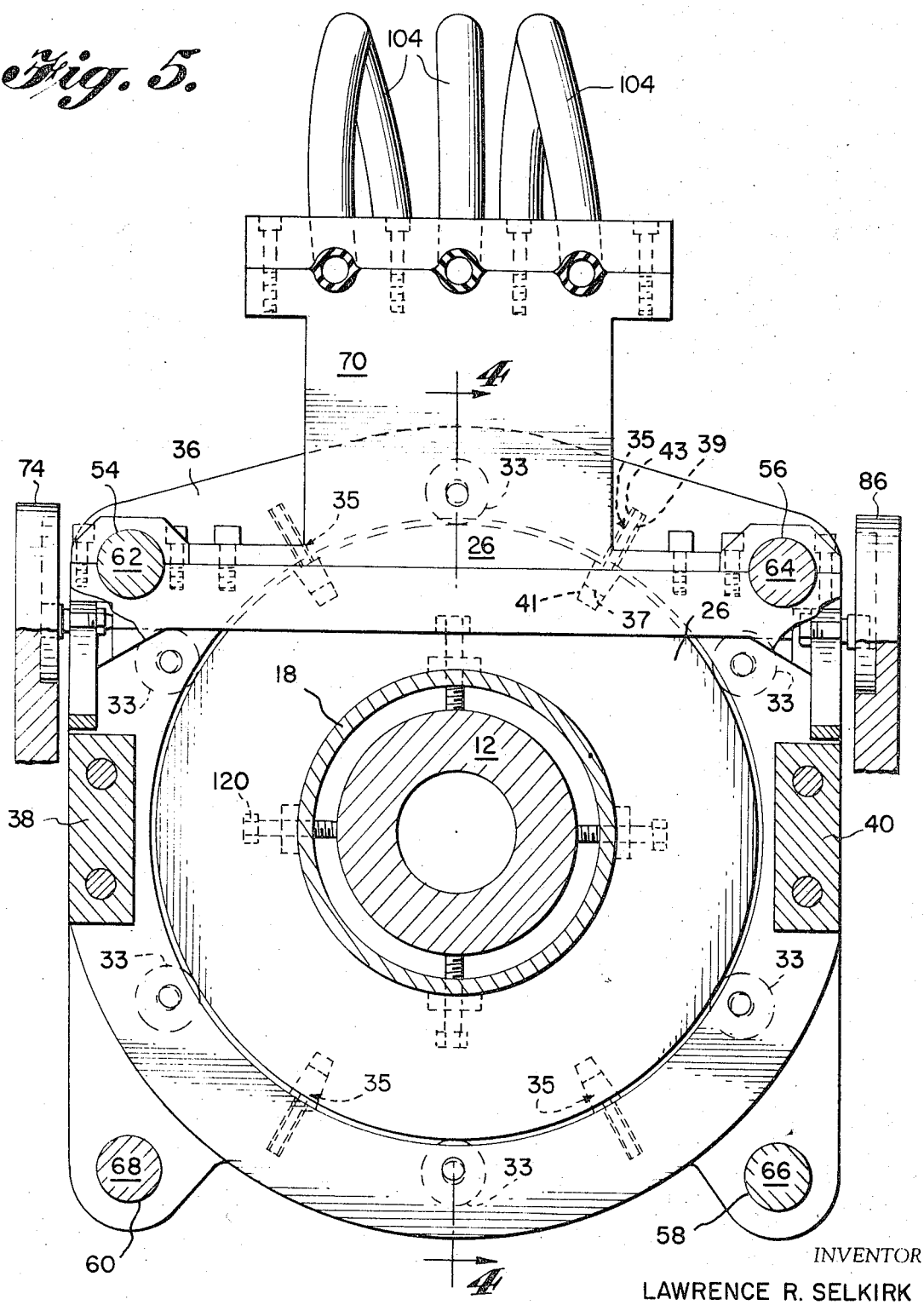
FIG. 5 is a transverse cross-sectional view taken along line 5—5 of FIG. 8.

Body 16 includes a member 34 surrounding annular plate 24, as best seen in FIGS. 3 and 4. Similarly, as shown in FIGS. 4 and 5, member 36 surrounds annular plate 26. Members 34 and 36 are rotatably supported around plates 24 and 26, respectively, by suitable means such as roller bearings 33. In addition at least one of the members 34 and 36 is coupled to its corresponding plate 24 and 26 by four V-bearings 35, depicted in FIG. 5 coupling member 36 to plate 26. As shown in FIG. 7, each V-bearing 35 includes a tapered foot portion 37 spring-loaded on a stem portion 39. Foot portion 37 fits within tapered annular groove 41 in plate 26, while stem portion 39 fits within opening 43 of member 36. The taper of foot portion 37 and groove 41, together with the spring loading of foot portion 37 on stem portion 39, insures a tight fit of V-bearing 35 within plate 26 and member 36. The V-bearings 35 prevent longitudinal movement between plates 24 and 26 and tube 18, on the one hand, and members 34 and 36 and the portion of body 16 affixed to them, on the other hand. Since groove 41 encircles plate 26, bearings 35 do not prevent relative rotation between plate 26 and member 36.

Members 34 and 36 are fastened to each other by horizontal members 38 and 40 and bolts 42. Member 34 includes openings 46, 48, 50 and 52, displaced approximately 90° from each other around the periphery of member 34. Member 36 includes corresponding openings 54, 56, 58 and 60 displaced substantially 90° from each other around the periphery of member 36. Rod 62 extends through openings 46 and 54, coupling member 34 to member 36. Likewise, rods 64, 66, and 68 extend through openings 48 and 56, openings 50 and 58, and openings 52 and 60, respectively, also coupling members 34 and 36. The eight openings 46—60 are aligned so that the four rods 62—68 have their center lines parallel to the center line of tube 12. Rods 62 and 64, which are on the same side of tube 12, are joined together by first bridge member 70 (FIG. 5). Similarly, rods 66 and 68 both on the other side of tube 12 are joined together by second bridge member 72 (FIG. 3).

Figure 8:
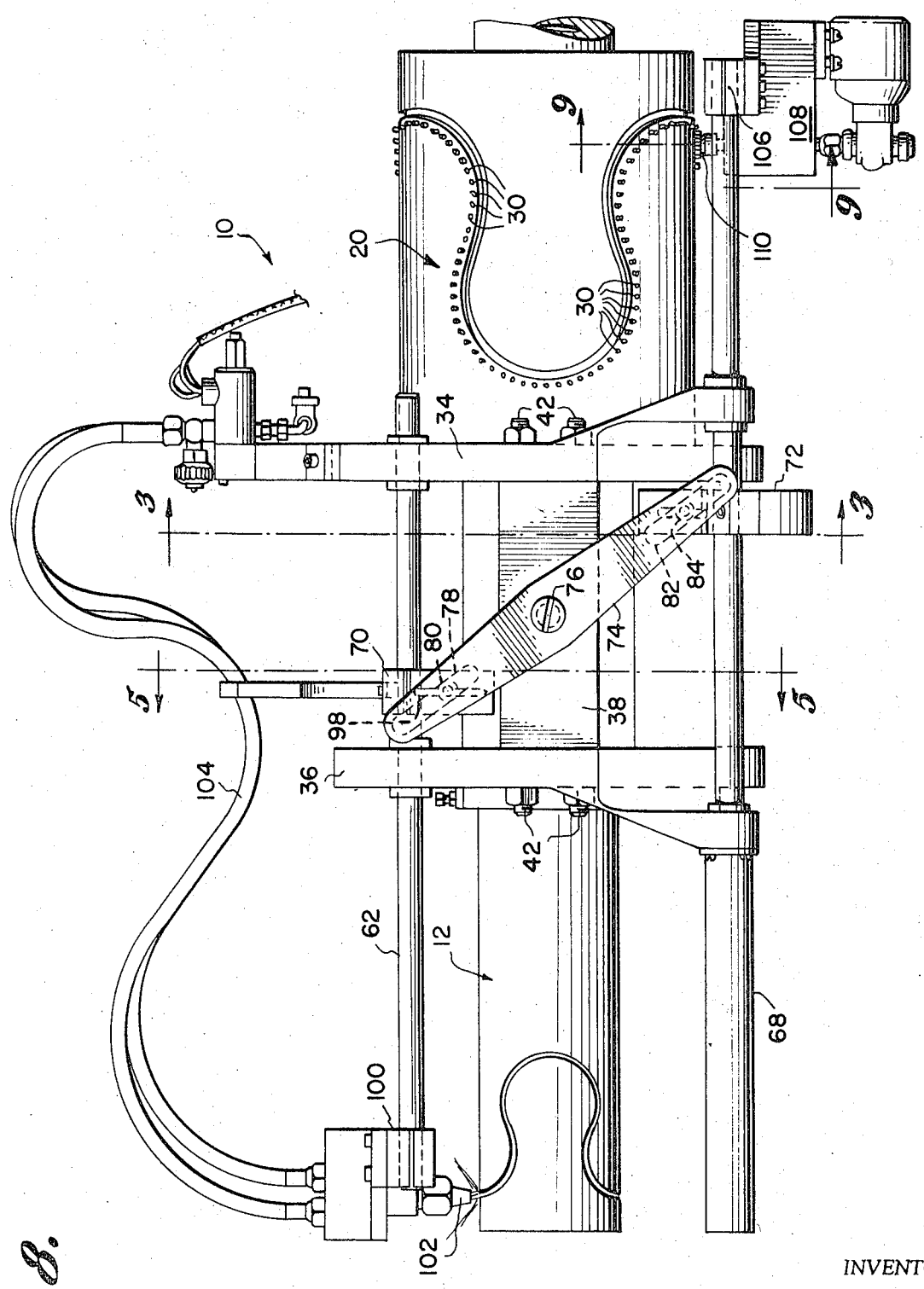
FIG. 8 is a side elevational view of the apparatus with the cutting torch extended to its extreme left or extended position.

Transfer arm 74 is pivotally attached to member 38 by means of fulcrum bolt 76 (FIG. 8). Transfer arm 74 is an elongated body having, in one end, a grooved slot 78 which extends longitudinally and engages pin 80 extending from first bridge member 70. Likewise, at the other end of arm 74 a grooved slot 82 extends longitudinally and engages pin 84 which is connected to second bridge member 72. On the opposite side of body 16 (FIG. 4), a similar transfer arm 86 is rotatably mounted upon fulcrum bolt 88, extending from horizontal member 40. At one end of arm 86 grooved slot 90 engages pin 92 extending from first bridge member 70, while at the other end of arm 86 grooved slot 94 engages pin 96 extending from second bridge member 72. Preferably, upper bridge member 70 includes a vertical slot 98 to permit adjustment of pin 80, thereby allowing great flexibility in choice of the moment arm between pin 80 and fulcrum bolt 76. Similar vertical slots are provided on the other side of bridge member 70 and on lower bridge member 72.

Figure 9:
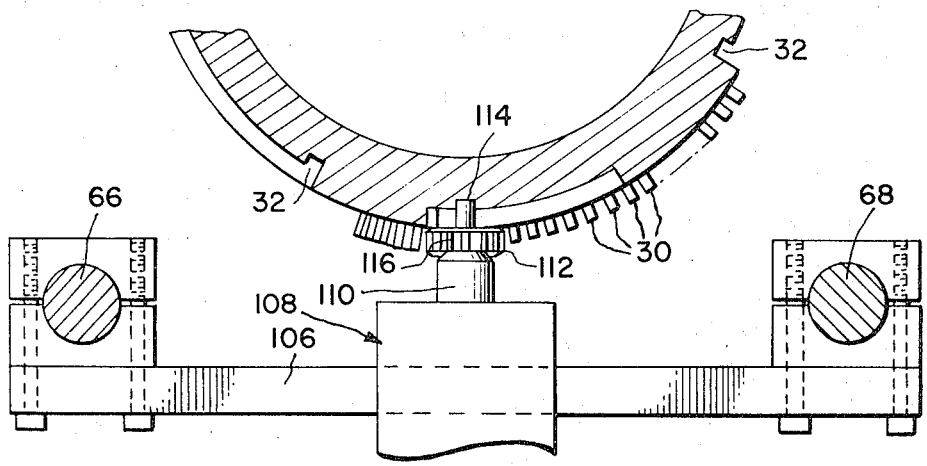
FIG. 9 is a fragmentary sectional view taken along line 9—9 of FIG. 8 showing the motor drive pinion in engagement with the pattern rack.

Bridge member 100 (FIG. 8) is mounted upon rods 62 and 64 and supports cutting tool 102, which, by way of example, might be an acetylene torch coupled by suitable means such as hoses 104 to the required gas supplies. Bridge member 106 is mounted upon lower rods 66 and 68 and supports motor assembly 108. As seen in detail in FIGS. 5 and 9, shaft 110 of motor assembly 108 is connected to pinion 112 and pin 114. The teeth 116 of pinion 112 engage pins 30 on sleeve 20, and pin 114 rides in and follows groove 32 on sleeve 20. Motor assembly 108 might be any suitable motor, for example, an electric motor provided with a variable speed control such as in control box 118 (FIG. 1).

When it is desired to cut a pipe or tubing by means of tube cutter 10, the tube 12 is pierced, and cutting tool 102 is energized. The motor 108 is started at a speed compatible with cutting tool 102 and the type of material, the thickness and the size of the tube 12. As motor 108 rotates pinion 112, teeth 116 engage pins 30 on sleeve 20. As a consequence, there is relative motion between rods 66 and 68 and sleeve 20. Annular plate 24 rotates with sleeve 20. Since plate 24 is connected to tubular member 18 which, in turn is connected to annular plate 26, member 18 and plate 26 also rotate with sleeve 20. Bolts 120 (FIGS. 3 and 5) hold tubular member 18 to tube 12; therefore, tube 12 also rotates with pattern 20.

Annular members 34 and 36 and their connecting horizontal members 38 and 40 together with rods 62 through 68 rotate relative to sleeve 20, and cutting tool 102 moves with rods 62 and 64. Consequently, tube 12 rotates with respect to cutting tool 102.

Pin 114 traces groove 32 of sleeve 20, and so as the path of groove 32 moves in a longitudinal direction, pin 114 causes motor assembly 108, and thus bridge member 106, to move longitudinally. This moves lower rods 66 and 68 in a longitudinal direction in accordance with groove 32 on sleeve 20. Transfer arms 74 and 86 cause corresponding movement of rods 62 and 64. As depicted in FIG. 8, when motor assembly 108 is at the extreme extended position of sleeve 20 (to the right in FIG. 8), cutting tool 102 is at the extreme extended position on tube 12 (to the left in FIG. 8). Likewise, as seen in FIG. 10, when motor assembly 108 is at its extreme closed position (to the left in FIG. 10), cutting tool 102 is at its extreme closed position on tube 12 (to the right in FIG. 10). Thus, the longitudinal displacement of cutting tool 102 is reversed from that of motor assembly 108, and the pattern of groove 32 and pins 30 on sleeve 20 must be reversed longitudinally with respect to the desired pipe cut.

The pattern on pipe 20 might represent the cut to be made in tube 12 as viewed on the outer surface of tube 12. Alternatively, the pattern on pipe 20 might represent that cut as viewed interiorly of the wall of tube 12 or on the inner surface of tube 12, each of which would be circumferentially shorter than the outer surface cut. The "cutting surface" of tube 12 thus might be either the outer surface, the inner surface or some other "surface" within or outside the tube wall. The ratio of the diameter of the selected cutting surface of tube 12 to the diameter of the pattern groove 32 in pipe 20 is the same as the ratio of the moment arm from pin 80 to fulcrum bolt 76 and the moment arm from fulcrum bolt 76 to pin 84. Grooves 78, 82, 90, 94 and 98 permit adjustment of the moment arms to accommodate different size tubes. Likewise, the longitudinal dimensions of the pattern traced by groove 32 bear the same relation to the longitudinal dimension of the cut to be made in the selected cutting surface of tube 12 as the outside diameter of sleeve 20 bears to the diameter of that cutting surface.

Figure 11A:
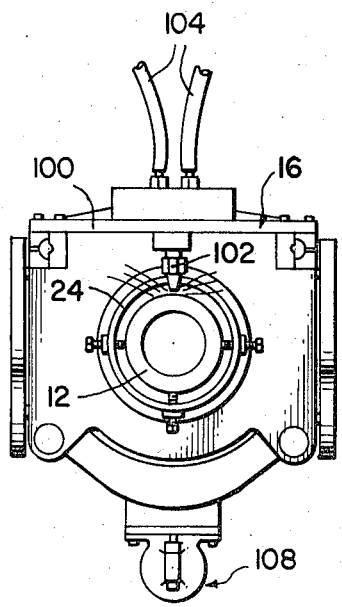
FIGS. 11A, 11B, and 11C show the machine as viewed from the torch end and illustrate the machine rotated about the axis of the tube as it automatically cuts the desired configuration.
Figure 11B:
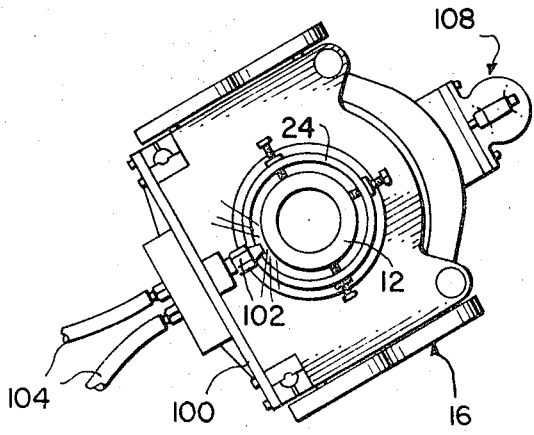
Figure 11C:
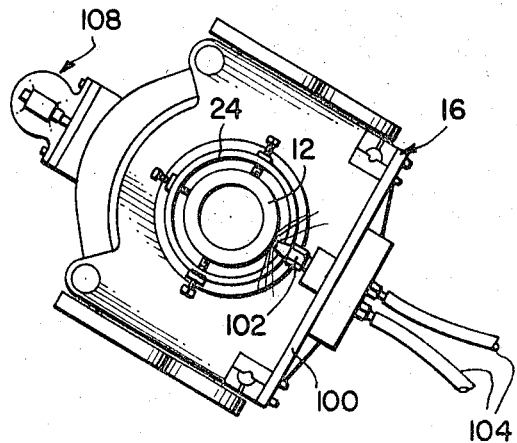

The relative rotation between cutting tool 102 and tube 12 is determined by the pattern of groove 32 on sleeve 20, but if no restraining forces are applied, the absolute rotation of both cutting tool 102 and tube 12 is somewhat random, determined by their relative masses and miscellaneous frictional forces. FIGS. 11A, 11B, and 11C depict this random rotation, showing cutting tool 102 and tube 12 at different orientations as each rotates. When cutting tool 102 is an acetylene torch, optimum operation is achieved with the flame directed downward. In such a case, rotation of rods 66 and 68 and of cutting tool 102 is restrained by suitable means (not shown) so that cutting tool 102 is maintained above tube 12, as in FIG. 1, and tube 12 rotates within stand 22.

Pins 30 and teeth 116 provide positive drive at a constant linear speed, regardless of the shape of the pattern of groove 32. Transfer arms 38 and 40 and rods 62—68 insure that this constant speed is transferred to cutting tool 102. Consequently, cuts with elaborate shapes can be made in tube 12. With cutting tool 102 pivotally mounted on bridge member 100, the angle of the cut can be readily controlled.

The above description of a preferred embodiment of the present invention has made reference to an acetylene torch and a pattern formed by pins and a groove, but other cutting tools and other patterns might be utilized. Thus, for example, the cutting tool might be a saw or a milling machine. Alternatively, a hot, ionized plasma-state material or an erosion blast of sand or fused particles could be utilized as a cutting tool. The pattern can be affixed to the outer surface of sleeve 20 by a magnetic tape which is followed by a pickup on motor assembly 108. The tube need not be cut adjacent one end thereof; the cut instead could be in the middle of the tube, or an opening of complex shape could be cut in one side of the tube.

Although the present invention has been described with reference to a preferred embodiment, numerous substitutions and alterations can be made, and still the resulting apparatus will be within the scope of the invention.

I claim:
1. Apparatus for cutting a tubular article in accordance with a predetermined pattern comprising a pattern member carrying the predetermined pattern and adapted for attachment to a tube for movement therewith; drive means for movement along said predetermined pattern; cutting means; said drive means and cutting means being separate from one another, and transfer means coupling said drive means and said cutting means and adapted for connection to the tube for movement relative thereto for transferring movement of said drive means along said predetermined pattern into movement of said cutting means along said tube, said transfer means including at least one transfer arm pivotally connected to each of said drive means and cutting means thereby interconnecting same, said at least one transfer arm in addition to being pivotally connected to each of said drive means and cutting means, also being pivotally carried in order to transfer longitudinal movement of said drive means to said cutting means.

2. Apparatus as claimed in claim 1 in which said pattern member comprises a tubular sleeve having the predetermined pattern on the outer surface thereof.

3. Apparatus as claimed in claim 2 in which the predetermined pattern comprises a groove in said outer surface and a plurality of pins extending from said outer surface at spaced intervals along said groove, said pins being adapted to engage said drive means.

4. Apparatus as claimed in claim 3 in which said drive means comprises a motor having an output shaft on which is mounted a pinion extending within said groove and having teeth for engagement of said pins to cause said motor to move along said groove as the output shaft rotates.

5. Apparatus as claimed in claim 1 in which said transfer means comprises a first rod connected to said drive means; a second rod connected to said cutting means; first and second annular members for rotatably encircling the tube; means interconnecting said first and second annular members; and at least one transfer arm pivotally connected to said interconnecting means and pivotally coupled to said first and second rods for transferring longitudinal movement of said first rod into longitudinal movement of said second rod.

6. Apparatus as claimed in claim 5 in which said pattern member comprises a tubular sleeve having the predetermined pattern on the outer surface thereof.

7. Apparatus as claimed in claim 6 in which the predetermined pattern comprises a groove in said outer surface and a plurality of pins extending from said outer surface at spaced intervals along said groove, said pins being adapted to engage said drive means.

8. Apparatus as claimed in claim 7 in which said drive means comprises a motor having an output shaft on which is mounted a pinion extending within said groove and having teeth for engagement of said pins to cause said motor to move along said groove as the output shaft rotates.

9. Apparatus as claimed in claim 8 in which said cutting means is an acetylene torch.

10. Apparatus as claimed in claim 1 in which said cutting means is an acetylene torch.